No. 883,054. PATENTED MAR. 24, 1908.
F. F. SMITH.
FIREPROOF GRAVITY SASH.
APPLICATION FILED MAY 23, 1907.
5 SHEETS—SHEET 1.
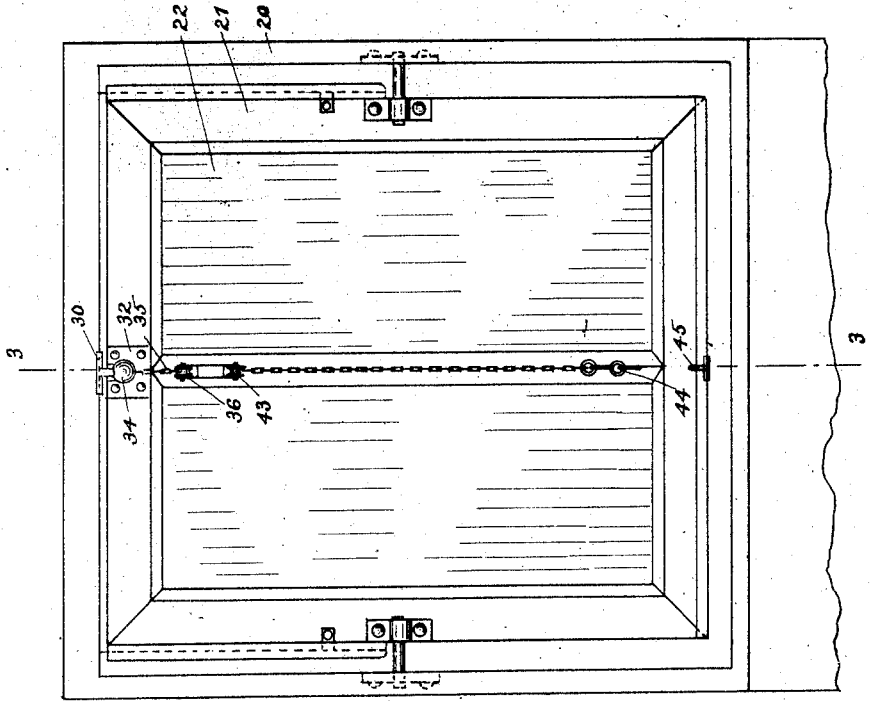
Fig. I.
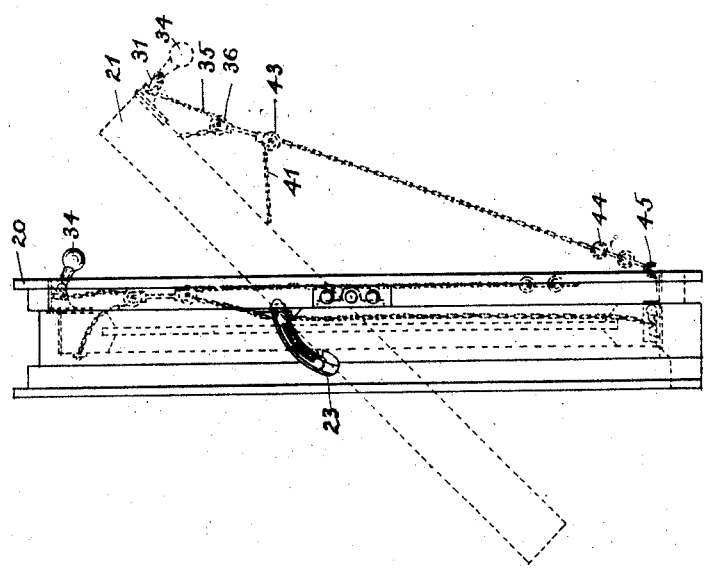
Fig. II.
Witnesses:
A. Faber du Faur
Sally O. Yeazly
Frank F. Smith Inventor
By his Attorney Fred't F. Schuetz No. 883,054. PATENTED MAR. 24, 1908.
F. F. SMITH.
FIREPROOF GRAVITY SASH.
APPLICATION FILED MAY 23, 1907.
5 SHEETS—SHEET 2.
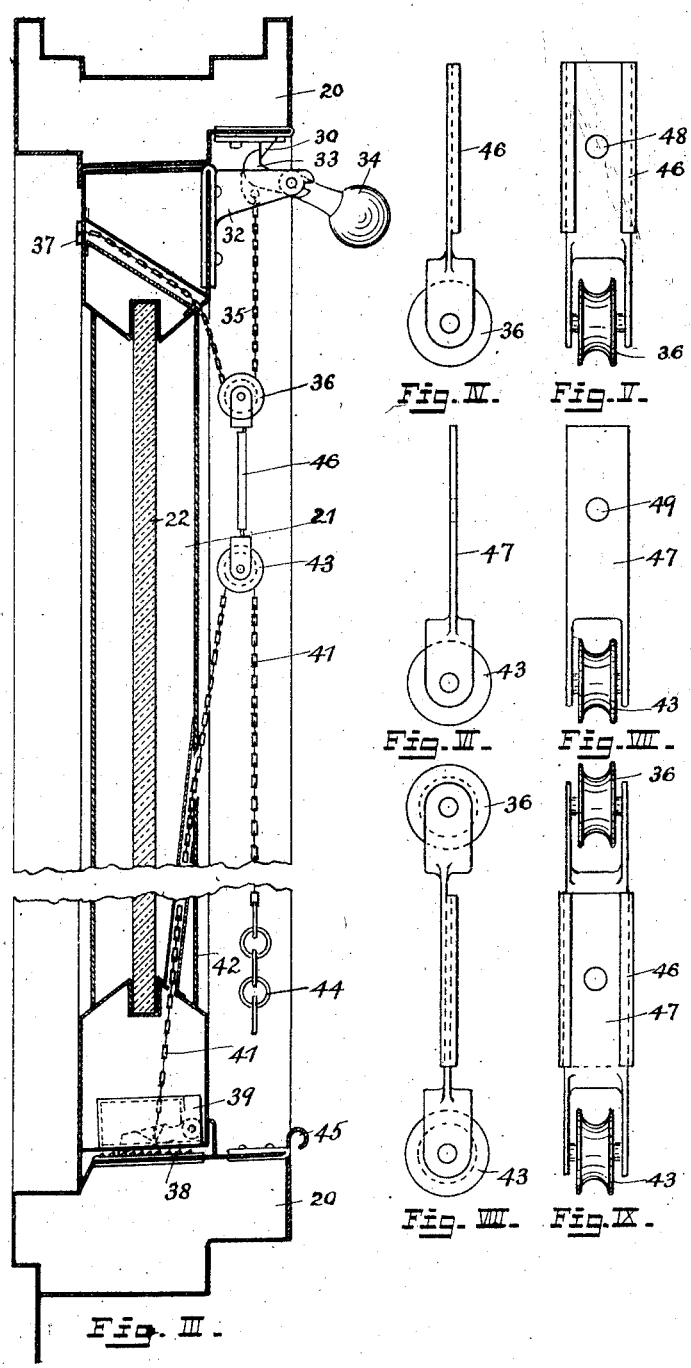

No. 883,054. PATENTED MAR. 24, 1908.
F. F. SMITH.
FIREPROOF GRAVITY SASH.
APPLICATION FILED MAY 23, 1907.
5 SHEETS—SHEET 3.
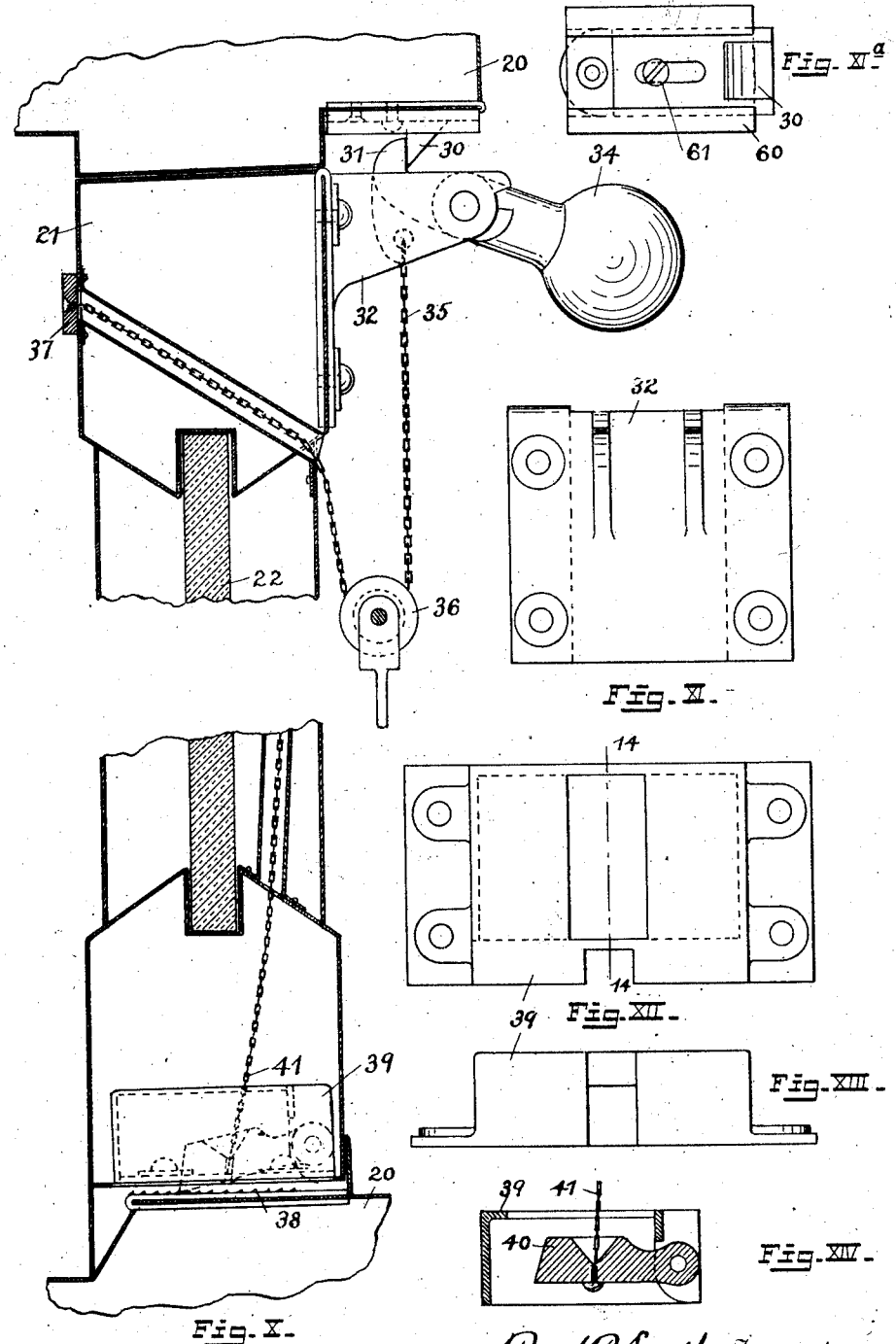

No. 883,054. PATENTED MAR. 24, 1908.
F. F. SMITH.
FIREPROOF GRAVITY SASH.
APPLICATION FILED MAY 23, 1907.
5 SHEETS—SHEET 4.
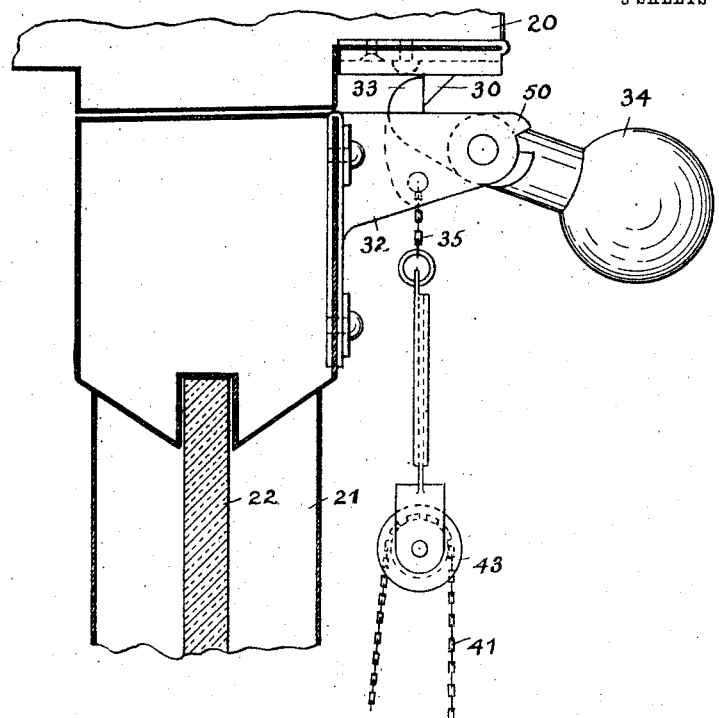
Fig. X<sup>a</sup>.
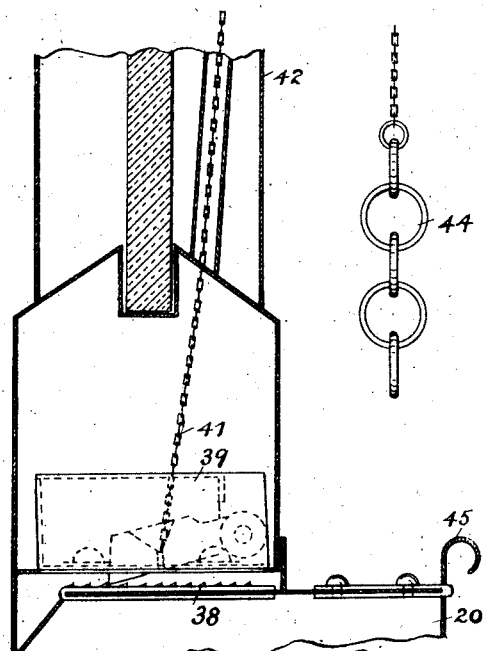
Witnesses:
A. Faber du Faur
Sally O. Yudizky
Frank F. Smith, Inventor
By his Attorney Fred'k P. Schuetz

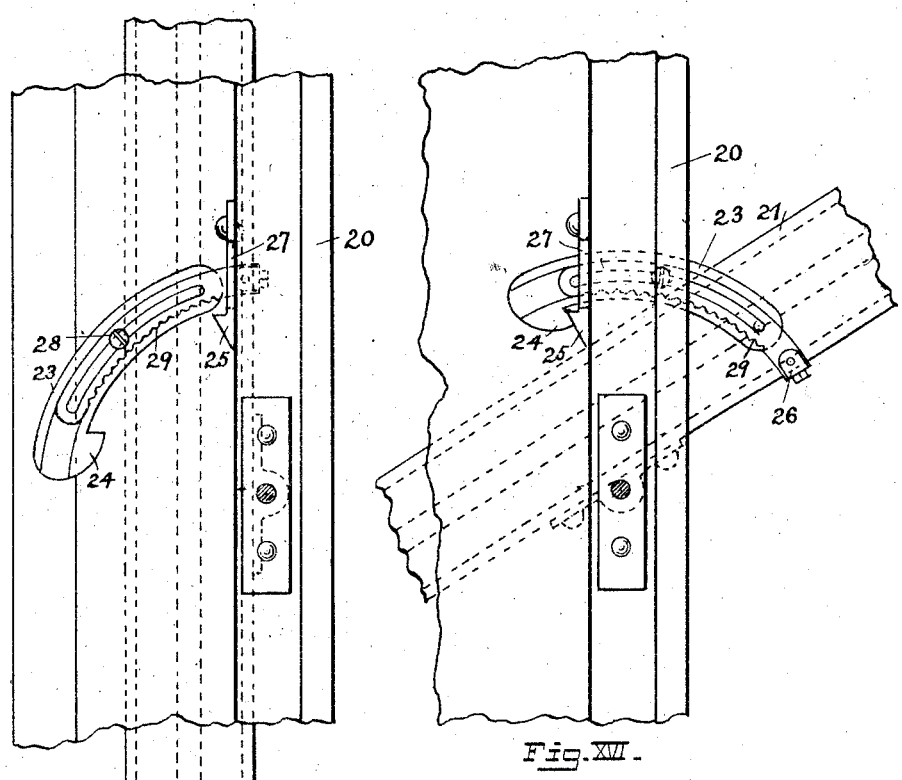

UNITED STATES PATENT OFFICE.

FRANK F. SMITH, OF NEWARK, NEW JERSEY.

FIREPROOF GRAVITY-SASH.

No. 883,054.

Specification of Letters Patent.

Patented March 24, 1908.

Application filed May 23, 1907. Serial No. 375,306.

*To all whom it may concern:*

Be it known that I, FRANK F. SMITH, a citizen of the United States, and a resident of Newark, in the county of Essex and State of New Jersey, have invented certain new and useful Improvements in Fireproof Gravity-Sashes, of which the following is a specification.

My invention relates to fire-proof windows adapted to automatically close when exposed to a predetermined temperature; and it has for its object a window of this character which will lock both at the top and the bottom, and which may be readily opened and adjusted.

For this purpose my invention consists essentially of a fire-proof gravity window sash, or the like suitably pivoted and provided with means whereby the said window sash is locked to the frame of the window both at the top and bottom; means to simultaneously open said locks and to hold the window sash in opened position; and means to cause said opened window sash to be automatically closed and locked both at the top and bottom when exposed to a predetermined temperature.

The nature of my invention will be best understood in connection with the accompanying drawings in which—

Figure 1 is a front elevation of the window in closed position. Fig. 2 is a side elevation showing the window sash opened. Fig. 3 is a partial sectional view on the line 3—3 Fig. 1. Figs. 4 to 9 are views illustrating a fusible link used in connection with the window. Fig. 10 is an enlarged partial transverse vertical section through the frame and sash. Fig. 10ª is a similar view showing a modification. Fig. 11 is a front elevation of a bracket. Fig. 11ª is a view of the adjustable stop. Fig. 12 is a plan view and Fig. 13 a front elevation of the casing containing a catch. Fig. 14 is a sectional view on the line 14—14 Fig. 12. Fig. 15 is an enlarged partial side view showing the window closed, and the adjustable latch. Fig. 16 is a similar view showing the window sash opened. Fig. 17 is a plan view and Fig. 18 is a side elevation of the adjustable latch. Fig. 19 is a sectional view on the line 19—19 Fig. 18.

In the drawings, 20 designates a sheet metal frame of the usual construction to which is fitted a sheet metal sash 21 provided with wired glass window panes 22. The sash 21 is pivoted to the frame 20 somewhat above its center of gravity, so that the same will be slightly unbalanced and when held open will automatically return to closed position if released. An adjustable latch 23, one on each side of the sash, (Figs. 15 to 19) is pivoted to the sash as shown and passes through a slot in the frame, its outer end being provided with a catch 24 adapted to be engaged by the stop 25 when the window is opened as shown in Fig. 16. The stop 25 is integral with a piece secured to the frame, and is slotted so as to allow the latch to pass completely through when desired. The extent the window may be opened is determined by the stop, but the window may be opened entirely by lifting the said adjustable latch about its pivot 26 and drawing it through the slot 27 of the stop 25. The extent of opening of the window may also be varied by adjusting the latch 23 which is made in two parts, as shown in Figs. 17 to 19, the one piece being slotted and adapted to slide upon the other; and the two being held together by means of the clamping bolt 28 and teeth 29. The latch 23 is of sufficient weight to cause the catch 24 to always engage with the stop 25, unless purposely raised to permit it to pass through the said slot 27. The window is further provided with means whereby the sash 21 is automatically locked to the frame 20 both at the top and bottom when the window is closed.

The upper locking means comprises an adjustable stop 30 secured to the frame 20 and a weighted lever or latch 31 pivoted to a bracket 32 (Fig. 11) secured to the sash 21. This bracket is readily fitted over the wall of sash 21 by making a cut in the same. The stop 30 is adjustable within a piece 60 fitted over the wall of the frame 20 and is fixed by means of a set screw 61. The inner arm of the lever 31 is adapted to engage with the stop 30, and its outer arm is provided with a weight 34. A projection 50 from the bracket 32 acts as a stop to limit the downward motion of the inner arm of the lever 31. To the inner end of the said lever is secured a chain or cord 35 passing about the pulley wheel 36, and through the sash 21. This chain or cord is held to the outer side of the sash by means of a fusible connection such as the nut 37, or simply by a mass of fusible metal. Fig. 10ª shows a modification in which the chain is fastened directly to the upper member of the fusible link instead of passing about the pulley wheel 36 and through the sash 21.

The lower locking means comprises a metal base or surface 38 provided with suitably shaped ridges, said base or surface being secured to the frame 20. Directly above this surface and secured to the sash, is a suitable box or casing 39 (Figs. 12, 13) open at the bottom and containing a weighted pawl or catch 40 hinged to the box and adapted to drop through its bottom. This catch 40 is provided with a locking edge adapted to engage with the ridges 38. A chain or cord 41 is attached by means of a fusible connection at the outer side of the catch 40 passing through said pawl or catch and through the inner sash bar 42 and about a pulley wheel 43. The outer end of this chain is provided with means such as the rings 44 adapted to engage with a hook 45 secured to the frame 20.

Both of the above described locking means may be readily affixed to windows already set in place and are inaccessible from the outside when the window is closed. A fusible connection is thus provided both on the inside and outside of sash and on the underside; or as shown in the modification Fig. 10ª, simply on the inside and on the under side. In either case, when the sash is open, a fusible connection is presented both on the inside and the outside of the frame as required by the fire underwriters.

The two pulley wheels 36 and 43 are respectively attached to the pieces 46 and 47 forming part of a fusible link. This fusible link with the attached pulley wheels is shown in detail in Figs. 4 to 9. The side edges of the piece 46 are turned over as shown forming a channel or guide for the piece 47. The two pieces are held together by means of some fusible alloy or compound retained in the holes 48 and 49. In the link as used in the modification, the upper pulley not being necessary, is omitted.

To open the window and simultaneously unlock both the top latch and the bottom catch, it is necessary only to pull outwardly the chain 41. This raises the catch 40 and also draws down the inner arm of the lever 31 unlocking the same. The window sash is shown in opened position in dotted lines (Fig. 2), the rings 44 being held by the hook 45.

Should sufficient heat strike the sash at the inside when in opened position, the two parts 46 and 47 of the fusible link would part owing to the melting of the fusible compound and thus release the chain and locks. Should sufficient heat strike the outer side or the bottom of the sash the fusible connection 37 or the fusible connection at the catch 40 will part, and thereby release the chains as before. The window thus automatically closes; and the levers 31 and 40 being free, lock the sash 21 to the frame 20.

In the foregoing, the various devices have been shown as applied only to a window sash, but it is evident that they may be applied for other similar purposes, such as in connection with a sky light, door or the like. A window or the like thus provided will, if open, almost instantaneously and automatically close and lock upon being exposed either upon the inside or outside of the frame to fire or to heat from any source. The window sash, and both locks (one at the top and one at the bottom to conform with the underwriters requirements) are gravity acting and therefore positive. No springs are employed, and the window normally opens only to a predetermined extent.

I claim:

1. In a fire-proof window: a pivoted gravity sash; a pivoted gravity latch at the top of said sash; a stop secured to the frame of said window and engaged by said latch to lock said window at the top of said sash; a gravity catch at the bottom of said sash; a series of ridges upon said frame adapted to be engaged by said catch to lock the sash at the bottom; a fusible link provided with a pulley wheel at each end; a chain in connection with said latch, passing about the upper pulley wheel of said fusible link, and secured to said sash; and a second chain in connection with said catch and passing about the lower pulley wheel of said fusible link and provided with means whereby it may be secured to the frame.

2. In a fire-proof window: a pivoted gravity sash; a pivoted lever or latch at the top of said sash, its outer arm being provided with a suitable weight; a stop secured to the frame of said window, and adapted to be engaged by the inner arm of said lever or latch to lock the said window sash at the top; a hinged gravity catch at the bottom of said sash, a series of ridges upon a piece mounted upon the frame and adapted to be engaged by said catch to lock the window sash at the bottom; a fusible link provided with a pulley wheel at each end; a chain connected to the inner arm of said pivoted lever or latch, passing freely about said upper pulley wheel, and freely through the upper portion of said sash; fusible means to secure said chain at the outer side of said sash; a second chain passing freely through the said catch and secured thereto by fusible means, and passing also freely through the lower portion of said sash, and thence through the inner sash bar and about the lower pulley wheel of said fusible link; and means to secure said second chain to said frame.

3. In a fire-proof window: a pivoted gravity sash; a pivoted lever or latch at the top of said sash; its outer arm being provided with a suitable weight; a stop secured to the frame of said window and adapted to be engaged by the inner arm of said lever or latch to lock the said window sash at the top; means to limit the extent of the downward motion of said inner arm; a hinged gravity catch at the bottom of said sash; a series of ridges upon a piece mounted upon the frame and adapted to be engaged by said catch to lock the window sash at the bottom; a fusible link provided with a pulley wheel at each end; a chain connected to the inner arm of said pivoted lever or latch, passing freely about said upper pulley wheel, and freely through the upper portion of said sash; fusible means to secure said chain at the outer side of said sash; and a second chain passing freely through the said catch and secured thereto by fusible means, and passing also freely through the lower portion of said sash, and thence through the sash bar and about the lower pulley wheel of said fusible link; means to secure said second chain to said frame; an adjustable latch pivotally connected to said sash, passing through a portion of the frame of said window, and a stop secured to the frame and adapted to engage with said latch to prevent the window from being opened beyond a predetermined extent.

4. In combination with a fire-proof window; a bracket adapted to be secured to and to fit over a wall of the sash of said window; a gravity lock, comprising: a lever pivotally secured to the said bracket, its inner arm being provided with a latch and the outer arm with a weight; and a stop secured to the frame of said window and adapted to engage the latch of said lever to lock said window.

5. In combination with a fire-proof window: a bracket adapted to be secured to and to fit over a wall of the sash of said window; a gravity lock, comprising: a lever pivotally secured to the said bracket, its inner arm being provided with a latch and the outer arm with a weight; and an adjustable stop secured to the frame of said window and adapted to engage the latch of said lever to lock said window.

6. In combination with a fire-proof window: a bracket adapted to be secured to and to fit over a wall of the sash of said window; a gravity lock, comprising: a lever pivotally secured to the said bracket, its inner arm being provided with a latch and its outer arm with a weight; means to limit the extent of downward motion of the inner arm of said lever; a piece secured to the frame of said window; and a stop adjustable with respect to said piece and adapted to engage the latch of said lever to lock said window.

Signed at Newark in the county of Essex and State of New Jersey this 21st day of May A. D. 1907.

FRANK F. SMITH.

Witnesses:
A. FABER DU FAUR,
FRED'K F. SCHUETZ.